United States Patent
Silitonga et al.

(10) Patent No.: US 9,479,093 B2
(45) Date of Patent: Oct. 25, 2016

(54) MOTOR DRIVING DEVICE

(71) Applicant: NIDEC SERVO CORPORATION, Kiryu-shi, Gumma (JP)

(72) Inventors: Charles Simson Halason Silitonga, Kiryu (JP); Toshihiro Okabe, Kiryu (JP); Akiko Soma, Kiryu (JP); Makoto Yajima, Kiryu (JP); Hiroaki Taka, Kiryu (JP)

(73) Assignee: NIDEC SERVO CORPORATION, Gumma (JP)

( * ) Notice: Subject to any disclaimer, the term of this patent is extended or adjusted under 35 U.S.C. 154(b) by 151 days.

(21) Appl. No.: 14/456,065

(22) Filed: Aug. 11, 2014

(65) Prior Publication Data
US 2015/0054435 A1 Feb. 26, 2015

(30) Foreign Application Priority Data

Aug. 23, 2013 (JP) .................................. 2013-173581

(51) Int. Cl.
H02P 6/16 (2016.01)
H02P 6/08 (2016.01)
H02P 29/00 (2016.01)
H02P 7/28 (2016.01)

(52) U.S. Cl.
CPC ............... *H02P 6/08* (2013.01); *H02P 7/2815* (2013.01); *H02P 23/22* (2016.02); *H02P 29/0005* (2013.01)

(58) Field of Classification Search
CPC ............ H02P 27/08; H02P 6/08; H02P 7/29; H02P 7/2913
USPC .................. 318/400.04, 400.05, 400.11, 599
See application file for complete search history.

(56) References Cited

U.S. PATENT DOCUMENTS

| 6,329,778 | B1* | 12/2001 | Culp | ..................... | A61B 90/98 318/432 |
|---|---|---|---|---|---|
| 6,545,438 | B1* | 4/2003 | Mays, II | ................... | H02P 6/08 318/400.01 |
| 7,327,118 | B2* | 2/2008 | Pant | ......................... | H02P 1/18 318/756 |
| 8,049,447 | B2* | 11/2011 | Jeung | ..................... | H02P 6/085 318/400.04 |
| 8,312,590 | B2* | 11/2012 | Norell | ................... | A47L 9/2831 15/313 |
| 2007/0041224 | A1* | 2/2007 | Moyse | ................. | H02M 3/157 363/21.01 |
| 2007/0230926 | A1 | 10/2007 | Mehlhorn | | |
| 2009/0137199 | A1* | 5/2009 | Jeung | ..................... | F04D 27/004 454/230 |
| 2009/0224709 | A1 | 9/2009 | Jeung | | |
| 2011/0181216 | A1* | 7/2011 | Bass | ......................... | 318/400.11 |
| 2012/0176075 | A1 | 7/2012 | Taka | | |
| 2012/0200244 | A1* | 8/2012 | Otokawa | .................. | H02P 6/182 318/400.13 |
| 2014/0042878 | A1* | 2/2014 | Silitonga | ............ | H02K 11/0073 310/68 R |

FOREIGN PATENT DOCUMENTS

| EP | 1 710 905 A1 | 10/2006 |
|---|---|---|
| EP | 1 871 000 A1 | 12/2007 |
| EP | 2 485 390 A2 | 8/2012 |
| JP | 4-208087 A | 7/1992 |
| JP | 2004-260965 A | 9/2004 |
| JP | 3965791 B2 | 8/2007 |

* cited by examiner

*Primary Examiner* — Bentsu Ro
*Assistant Examiner* — Thai Dinh
(74) *Attorney, Agent, or Firm* — Keating & Bennett, LLP

(57) ABSTRACT

A motor driving device includes an analog to digital conversion circuit to which a speed command voltage instructing a rotation speed of a motor is inputted, and a microcomputer configured and programmed to generate a speed command having a pulse width which is changed according to the speed command voltage based on an output signal of the analog to digital conversion circuit. Further, the motor driving device includes a signal isolator configured to transmit the speed command between an input and an output while providing isolation between the input and the output, and a drive circuit configured to generate a driving signal in response to the speed command outputted from the signal isolator and to change the rotation speed of the motor.

5 Claims, 6 Drawing Sheets

Fig. 5A
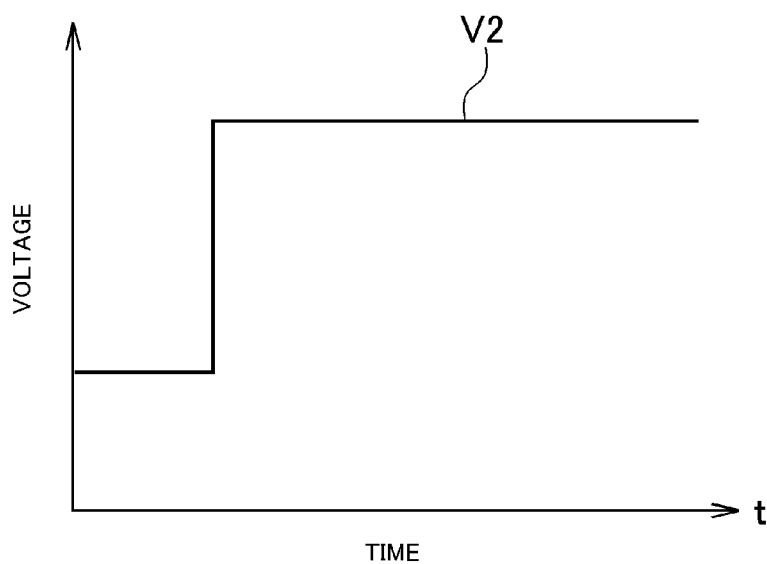
Fig. 5B
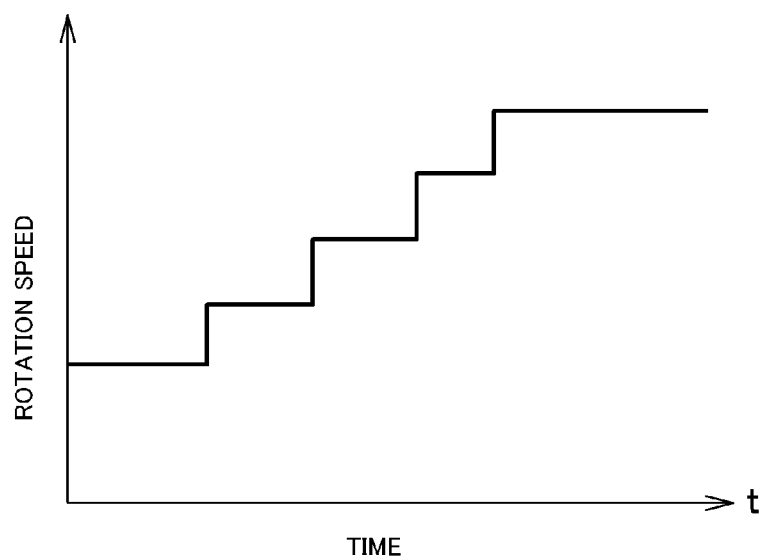

MOTOR DRIVING DEVICE

BACKGROUND OF THE INVENTION

1. Field of the Invention

The present invention relates to a motor driving device configured to drive a motor such as a fan motor that forcibly circulates cold air in a freezing showcase or a refrigerator.

2. Description of the Related Art

Conventionally, in a fan motor for forcibly circulating cold air in a freezing showcase, a refrigerator, or the like, it is required to keep the rotation speed constant, to change the rotation speed depending on the situation inside the refrigerator, or to vary the rotation speed in accordance with a predetermined profile. Such control of the rotation speed is performed by a motor driving device. For a fan motor of this type, various devices have been proposed.

From the viewpoint of electric power saving and ease of control, a brushless motor is often used as a motor to be driven by the motor driving device of this type. In this case, some components of the motor driving device, such as a rectifying circuit and a drive circuit for supplying an electric current to the brushless motor, are arranged in a motor case.

Recently, in a convenience store or a supermarket, it is required to collectively or individually manage a plurality of showcases. This makes it necessary to individually control the rotation speed of fan motors provided in each of the showcases. For this reason, the motor driving device is provided with an interface through which the rotation speed can be controlled from the outside.

FIG. 7 is a block diagram showing a motor driving device having the interface through which the rotation speed can be controlled from the outside and a driving target. The driving target of a motor driving device 1 is a fan motor 2 which is a three-phase brushless motor. In the motor driving device 1, AC 100 V or AC 200 V from a commercial power source is inputted to a power supply circuit 3. The power supply circuit 3 generates a DC voltage for operation and supplies it to each unit.

In the motor driving device 1, a speed command S3 as a pulse width modulation signal is inputted from an input unit 6 to a controller 8. Further, a driver 11 receives output signals of hall elements 10A, 10B and 10C provided in the fan motor 2. The input unit 6 is an interface device for controlling the rotation speed of the fan motor 2. The pulse width modulation is a modulation technique in which a signal is transmitted by changing a ratio of the high voltage period and the low voltage period in a pulse of a constant frequency, and the pulse width modulation signal is used in various devices.

The driver 11 generates a three-phase driving signal for driving the fan motor 2 based on a driving signal from the controller 8 such that the current rotation speed obtained by using the output signals of the hall elements 10A, 10B, and 10C becomes equal to the rotation speed instructed by the speed command S3. A power module (PM) 12 drives the fan motor 2 by supplying the DC power outputted from the power supply circuit 3 to each of phases U, V and W of the fan motor 2 based on the driving signal outputted from the driver 11. Accordingly, the fan motor 2 is driven to rotate at a rotation speed corresponding to the speed command.

Further, in the motor driving device 1, the driving current of the fan motor 2 driven in this manner is detected by the driver 11. Then, the motor driving device 1 controls the drive timing of the power module 12 according to the output signals of the hall elements 10A, 10B and 10C such that the driving current does not exceed a specified reference value.

In the configuration shown in FIG. 7, the hall elements 10A, 10B and 10C, the driver 11, the power module 12, the controller 8 and a portion of the power supply circuit 3, as divided by a dashed line in FIG. 7, are accommodated in a motor case of the fan motor 2.

In a case where an interface through which the rotation speed can be controlled from the outside is installed, it is necessary for the input unit 6 associated with the interface to comply with the same safety standards as safety standards required for the fan motor. More specifically, it is required for a fan motor driving system connected to a commercial power source to comply with the safety standards of Underwriters Laboratories (UL) or the like in the case of using the commercial power source. Unless a measure is taken otherwise, the input unit 6 associated with the speed control needs to satisfy the safety standards in terms of electric shocks, lightning surges, noises and so forth, which may require large-scale measures. As a result, the configuration of the motor driving system is complicated.

SUMMARY OF THE INVENTION

In view of the above, preferred embodiments of the present invention simplify the configuration of an interface configured to control a rotation speed compared to conventional technology.

In accordance with a preferred embodiment of the present invention, a motor driving device includes an analog-to-digital conversion circuit to which a speed command voltage instructing a rotation speed of a motor is inputted; a microcomputer configured and programmed to generate a speed command having a pulse width which is changed according to the speed command voltage based on an output signal of the analog-to-digital conversion circuit; a signal isolator configured to transmit the speed command between an input and an output while providing isolation between the input and the output; a drive circuit configured to generate a driving signal in response to the speed command outputted from the signal isolator and to change the rotation speed of the motor.

With the above configuration, for the analog-to-digital conversion circuit and the microcomputer to which the speed instruction is inputted, it can be configured simply to satisfy the looser safety standards without having to meet the safety standards related to a commercial power source. Thus, it is possible to further simplify the configuration of the above-described structural elements as compared with the conventional structure. Further, since a speed command according to a varying pulse width is generated by the microcomputer, it is possible to generate a speed command according to various characteristics.

In the configuration of preferred embodiments of the present invention, the microcomputer may be configured and programmed to generate the speed command such that the pulse width changes stepwise in response to increase and decrease of the speed command voltage. Accordingly, it is possible to control the rotation speed of the motor according to the characteristics that the rotation speed is changed stepwise, The microcomputer may be configured and programmed to vary the pulse width of the speed command according to hysteresis characteristics in response to the increase and the decrease of the speed command voltage. Thus, since the rotation speed is prevented from excessively changing due to minute increase or decrease in the speed command voltage, it is possible to stably drive the motor.

Further, the analog-to-digital conversion circuit may include a plurality of systems so that the speed command voltage is attenuated at different attenuation rates and outputted through the systems, and the microcomputer may generate the speed command by selecting one of the systems according to the speed command voltage. With this configuration, for the low speed command voltage, it is possible to generate a speed command through a system in which an analog-to-digital conversion process is performed with much higher resolution. Thus, it is possible to generate a speed command by detecting the speed command voltage with much higher precision, thus executing the driving of the motor with higher accuracy.

Furthermore, the microcomputer may be configured and programmed to generate the speed command by gradually changing the pulse width according to a change in the speed command voltage. Thus, even when the speed command voltage changes steeply, it is possible to gradually vary the rotation speed of the motor, thereby driving the motor stably.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 5A and 5B are diagrams explaining the control for gradually changing the rotation speed.

DETAILED DESCRIPTION OF THE PREFERRED EMBODIMENTS

Hereinafter, preferred embodiments of the present invention will be described in detail with reference to the drawings.

Figure 1:
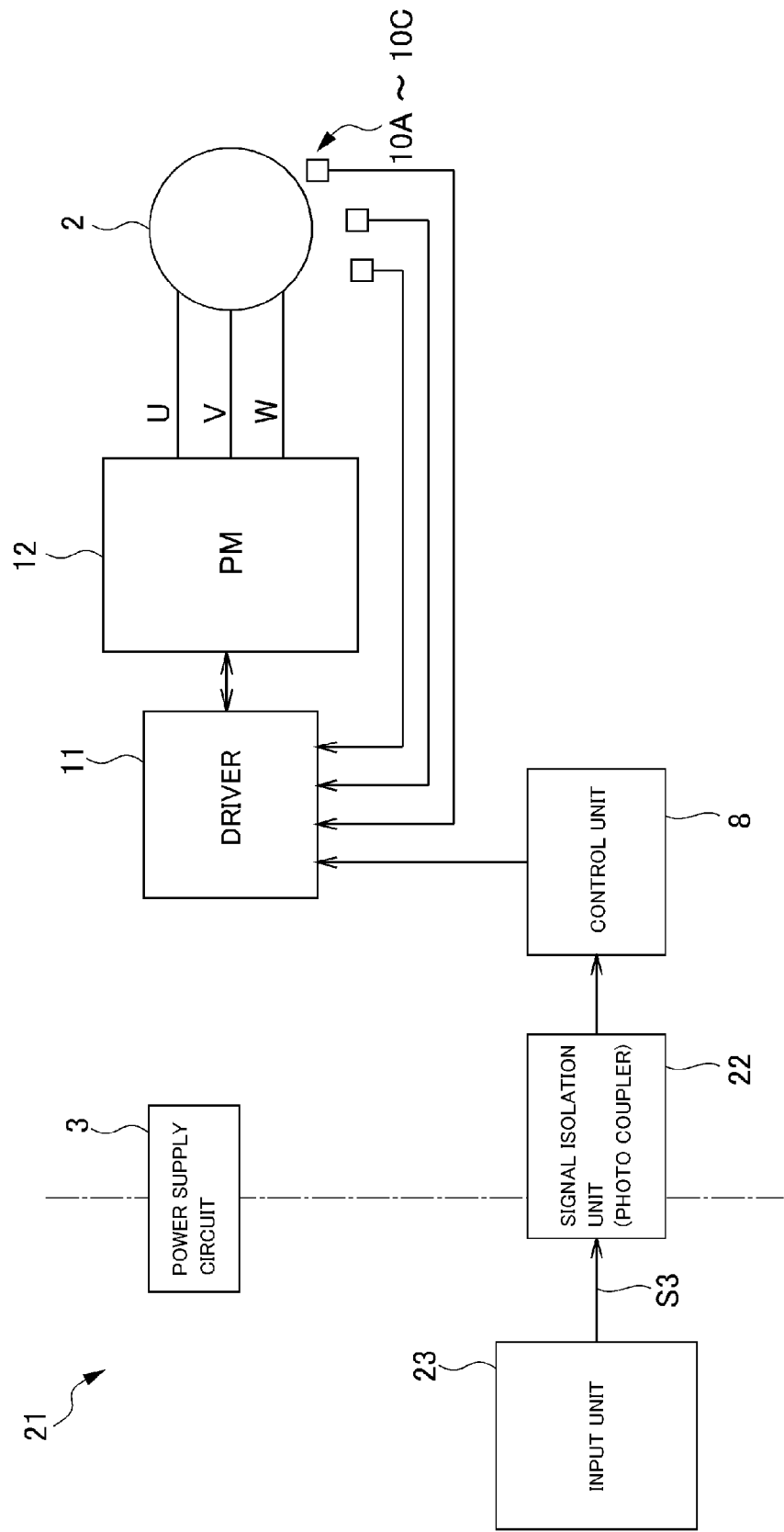
FIG. 1 is a block diagram illustrating a motor driving device according to a preferred embodiment of the present invention.
Figure 7:
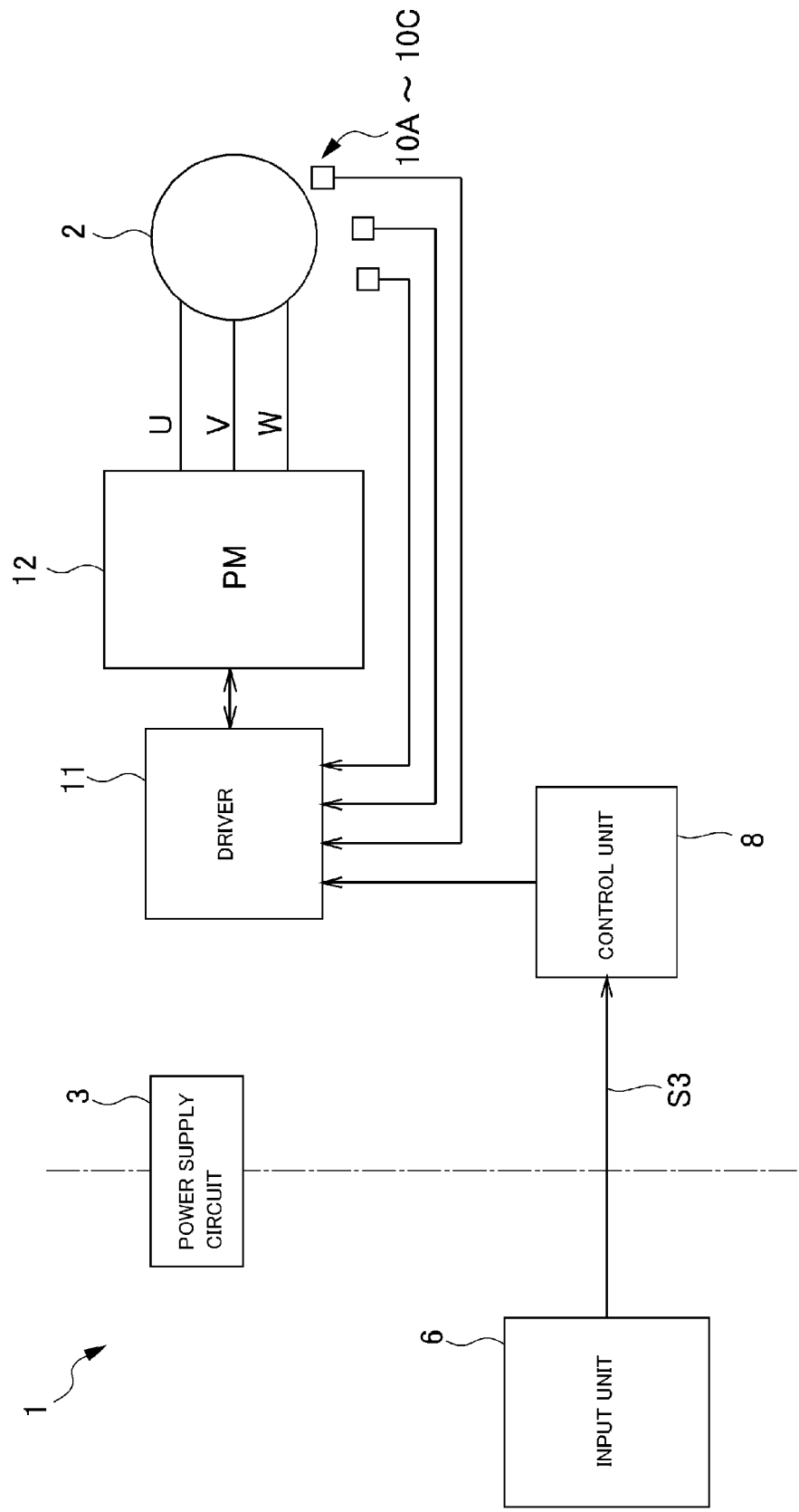
FIG. 7 is a block diagram showing a conventional motor driving device.

FIG. 1 shows a motor driving device 21 according to a preferred embodiment of the present invention, and the elements identical or similar to those shown in FIG. 7 are given the same reference numerals as those of FIG. 7. The motor driving device 21 preferably includes a signal isolator 22 installed between the controller 8 and an input unit 23. The input unit 23 associated with a speed command S3 is preferably operated by a power supply of Class II (with either a double or reinforced insulation barrier between the input and the output), e.g., a battery, and is provided with a configuration related to the signal isolator 22.

The signal isolator 22 is configured to transmit the speed command S3 from the input unit 23 to a main unit of the motor 2 while securing sufficient isolation between the input unit 23 and the main unit of the motor 2. The signal isolator 22 preferably includes, e.g., a photo coupler. The motor driving device 21 of this preferred embodiment preferably has the same configuration as the motor driving device 1 described above with reference to FIG. 7 except for the signal isolator 22, the input unit 23 and related configurations thereof.

With the configuration of the signal isolator 22, in the motor driving device 21, the input unit 23 as an interface through which an instruction of the rotation speed of the motor is inputted preferably is configured to satisfy relaxed safety standards without having to meet the safety standards related to a commercial power source. Thus, it is possible to simplify the structure as compared with the conventional configuration.

Figure 2:
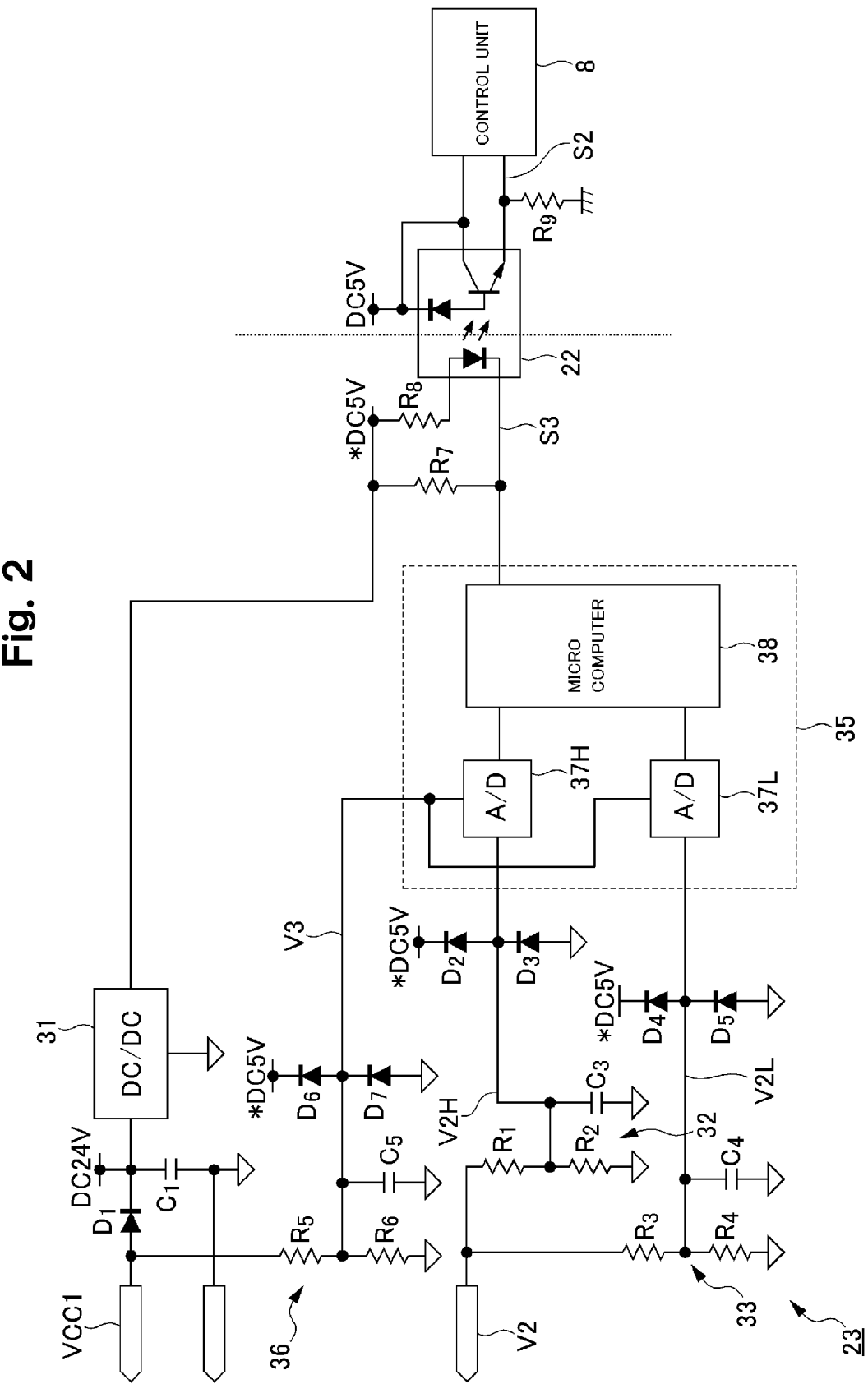
FIG. 2 is a connection diagram showing an input unit in the motor driving device of FIG. 1.

FIG. 2 is a diagram showing the input unit 23 and the related configuration. In the input unit 23, a power supply voltage VCC1 (24 V) is inputted to a DC to DC converter (DC/DC) 31 through a diode D1 and a noise removing capacitor C1, and the DC to DC converter 31 generates a power supply voltage (e.g., 5 V) for operating a logic circuit. Further, the input unit 23 receives a speed command voltage V2 which is a DC voltage instructing the rotation speed of the fan motor 2, i.e., a DC voltage generated from the power supply voltage VCC1 preferably by, e.g., a variable resistor (not shown), and the speed command voltage V2 is inputted to a first voltage divider circuit 32 which is a first attenuation circuit defined by resistors R1 and R2, and to a second voltage divider circuit 33 which is a second attenuation circuit defined by resistors R3 and R4.

In this preferred embodiment, the speed command voltage V2 is inputted as a DC voltage ranging from about 0 V to about 24 V generated from the power supply voltage VCC1. The first voltage divider circuit 32 attenuates the speed command voltage V2 of about 0 V to about 24 V by voltage division, and outputs a voltage of about 0 V to about 5 V equal to or less than the power supply voltage (5 V) for operating the logic circuit. Meanwhile, the second voltage divider circuit 33 attenuates the speed command voltage V2 of about 0 V to about 24 V and outputs a voltage of about 0 V to about 10 V, which is about twice the range of about 0 V to about 5 V of the output voltage of the first voltage divider circuit 32. Hereinafter, the output voltage of the first voltage divider circuit 32 and the output voltage of the second voltage divider circuit 33 are referred to as a high-voltage side speed command voltage V2H and a low-voltage side speed command voltage V2L, respectively.

In the input unit 23, the high-voltage side speed command voltage V2H is connected to the ground through a noise removing capacitor C3, and is inputted to the controller 35 while clamping the positive and the negative side thereof to +5 V and 0 V by diodes D2 and D3, respectively. Further, the low-voltage side speed command voltage V2L is connected to the ground through a noise removing capacitor C4, and is inputted to the controller 35 while clamping the positive and the negative side thereof to +5 V and 0 V by diodes D4 and D5, respectively.

Thus, as the low-voltage side speed command voltage V2L, only a voltage of 0 V-5 V corresponding to a lower voltage range of the speed command voltage V2 is inputted to the controller 35, and the controller 35 can detect the speed command voltage V2 by ensuring sufficient resolution at the low-voltage side.

Further, the input unit 23 attenuates the power supply voltage VCC1 by voltage division of a voltage divider circuit 36 constituted by resistors R5 and R6 to generate an output voltage V3 as a reference voltage for an analog-to-digital conversion circuits 37H and 37L. The output voltage V3 of the voltage divider circuit 36 is connected to the ground through a noise removing capacitor C5, and is inputted to the controller 35 while clamping the positive and the negative sides thereof to +5 V and 0 V by diodes D6 and D7.

The controller 35 generates a pulse width modulation signal (speed command) S3 with a pulse width varying according to the speed command voltage V2 by using the high-voltage side speed command voltage V2H, the low-voltage side speed command voltage V2L, and the output voltage V3 of the voltage divider circuit 36. The pulse width modulation signal S3 drives the photo coupler of the signal isolator 22. In the signal isolator 22, the anode of the photodiode is connected to a power supply through a resistor R8. Further, the pulse width modulation signal S3 outputted from the controller 35 is supplied to the cathode of the photodiode, and the cathode of the photodiode is pulled up to the power supply through a resistor R7. Accordingly, the controller 35 drives the photo coupler by the pulse width modulation signal S3.

Further, in the signal isolator 22, a phototransistor receives the light emitted from the photodiode and inputs an output signal S2 to the controller 8. The output signal S2 is pulled down by resistor R9 to thereby provide protection against floating voltage. Thus, the speed command preferably is conveyed from the controller 35 to a controller 8 through the photo coupler by simply varying the ratio of the high voltage period and the low voltage period in the pulse width modulation signal S3. As described above, the driving device 21 varies the rotation speed of the fan motor 2 in accordance with the speed command voltage V2.

In the controller 35, the high-voltage side speed command voltage V2H and the low-voltage side speed command voltage V2L is inputted to analog-to-digital conversion circuits 37H and 37L, respectively, and an analog-to-digital conversion process is performed. The analog-to-digital conversion circuits 37H and 37L perform the analog-to-digital conversion process by processing the comparison results obtained by comparing a plurality of comparison voltages, which is generated by dividing the reference voltage through a resistor ladder, with the high-voltage side speed command voltage V2H and the low-voltage side speed command voltage V2L, respectively.

The output voltage V3 of the voltage divider circuit 36 is applied as the reference voltage to the resistor ladder. Accordingly, even when the speed command voltage V2 varies depending on a change in the power supply voltage VCC1, the driving device 21 performs the analog-to-digital conversion process on the high-voltage side speed command voltage V2H and the low-voltage side speed command voltage V2L by using the reference voltage which changes in conjunction with the change in the power supply voltage VCC1. As a result, even when the power supply voltage VCC1 is lowered due to deterioration of the battery or the like, the driving device 21 drives the fan motor 2 properly.

In the controller 35, the output signals of the analog-to-digital conversion circuits 37H and 37L are preferably inputted to, for example, a microcomputer 38. Specifically, the speed command voltage V2 is attenuated at different attenuation rates and is inputted to the microcomputer 38 through a plurality of systems, e.g., two systems in the present preferred embodiment. Then, the microcomputer 38 selects one of the systems based on the speed command voltage V2.

Specifically, the microcomputer 38 determines the output signal of the analog-to-digital conversion circuit 37H or 37L based on a predetermined criterion. That is, if the speed command voltage V2 is low, the microcomputer 38 generates a pulse width modulation signal by performing the analog-digital conversion processing on results of the low-voltage side speed command voltage V2L outputted from the analog-to-digital conversion circuit 37L. On the other hand, if the speed command voltage V2 is high, the microcomputer 38 generates a pulse width modulation signal by performing the analog-digital conversion processing on results of the high-voltage side speed command voltage V2H outputted from the analog-to-digital conversion circuit 37H.

Thus, in the driving device 21, by using the analog-to-digital conversion circuits 37H and 37L having a smaller number of bits, it is possible to acquire the analog-to-digital conversion results of the speed command voltage V2 with sufficient resolution even when the voltage is low and to perform an analog-to-digital conversion process on the speed command voltage V2 in a large dynamic range. As a result, it is possible to control the rotation speed of the fan motor 2 with high accuracy by a simple configuration.

Figure 3:
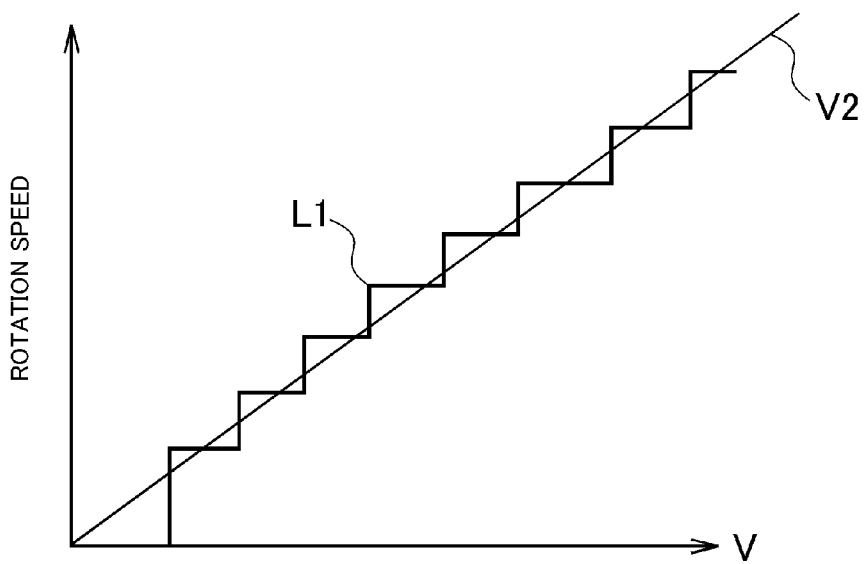
FIG. 3 is a diagram explaining the control characteristics by the input unit of FIG. 2.

As described above, by generating a pulse width modulation signal by selecting and processing one of the analog-to-digital conversion processing results of two systems, as shown in FIG. 3, the microcomputer 38 generates a speed command such that the pulse width changes stepwise in response to the increase and the decrease of the speed command voltage V2. Thus, as indicated by reference numeral L1, it is possible to control the fan motor 2 such that the rotation speed changes stepwise.

Specifically, the microcomputer 38 determines the analog-to-digital conversion processing results based on the criterion, and changes a target rotation speed of the fan motor 2 according to the determination results, thus variably controlling the rotation speed of the fan motor 2 stepwise. Thus, the driving device 21 drives the fan motor 2 stably by effectively avoiding pulsation of the rotation speed or the like due to continuous variation of the rotation speed.

Figure 4:
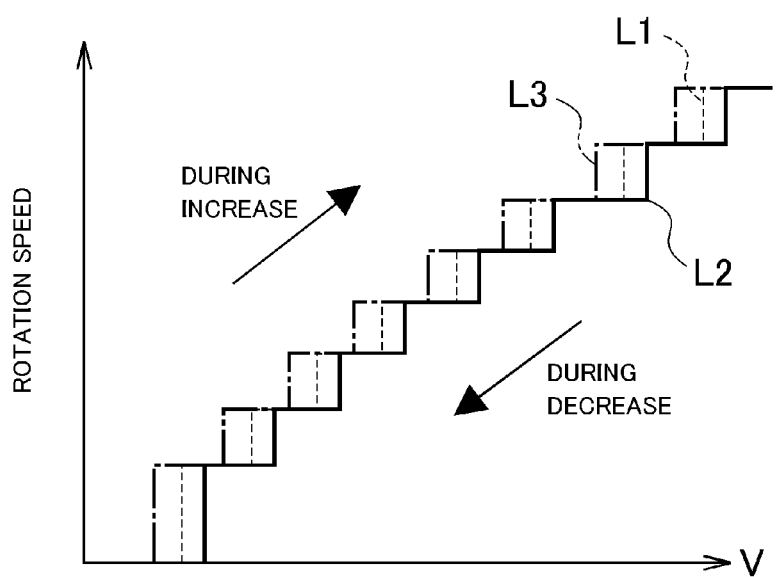
FIG. 4 is a diagram explaining the control according to the hysteresis characteristics.

Further, by changing the rotation speed of the fan motor 2 stepwise and by changing the criterion used for the stepwise change according to the current speed command voltage V2, as shown in FIG. 4, the speed command voltage V2 related to the change of the rotation speed is changed when the speed command voltage V2 increases (reference numeral L3) and decreases (reference numeral L2), thus changing the pulse width of the speed command according to the hysteresis characteristics. Thus, the driving device 21 drives the fan motor 2 in a stable manner by preventing excessive change in the rotation speed.

Further, the microcomputer 38 gradually changes the rotation speed so as to mitigate a rapid change in the speed command voltage V2, as shown in FIGS. 5A and 5B, in the stepwise control, thus effectively avoiding pulsation and overshoot in the rotation speed due to a rapid variation in rotation speed, for example.

Figure 6:
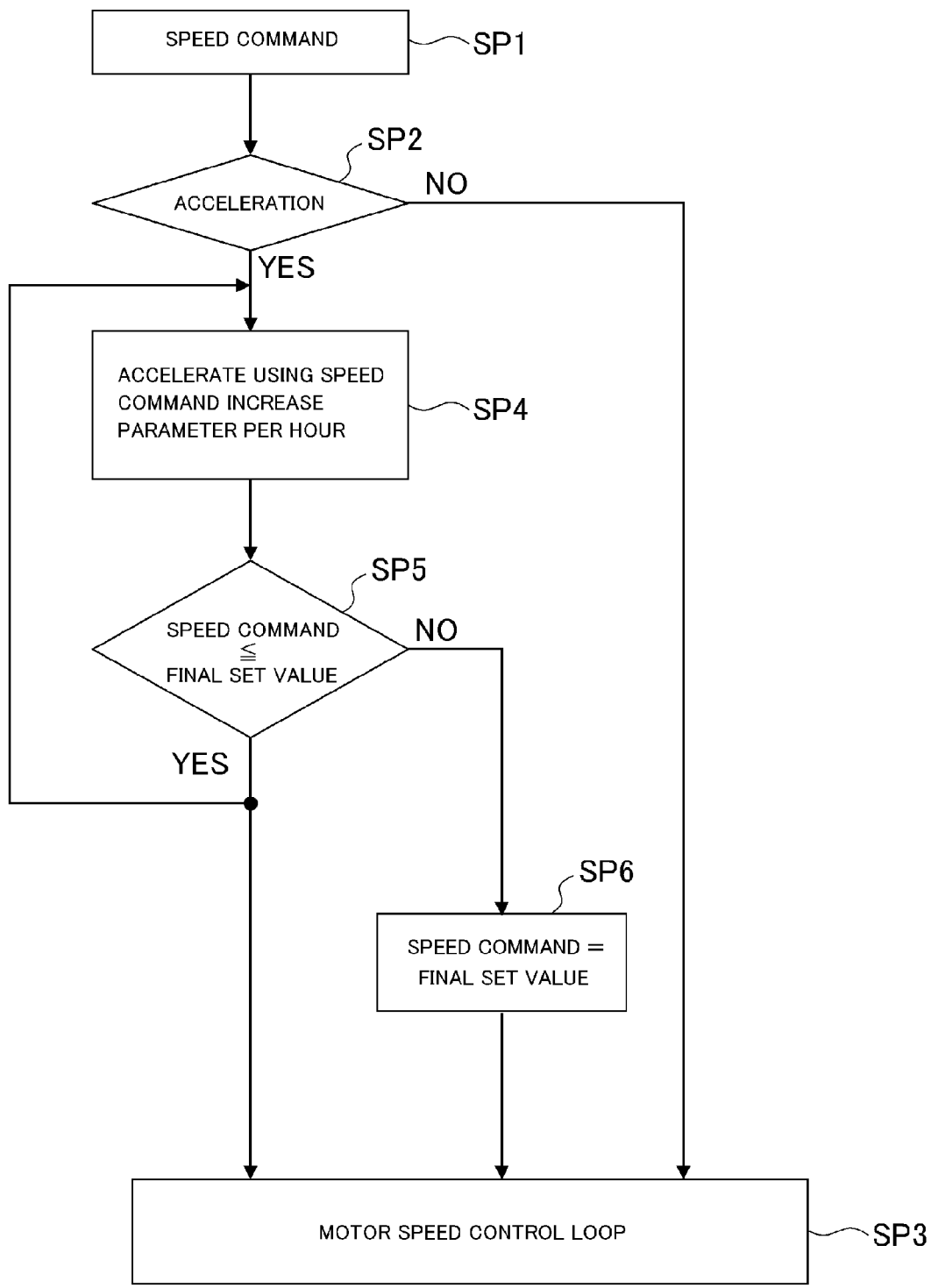
FIG. 6 is a flowchart for the control of FIG. 5.

FIG. 6 is a flowchart showing a processing procedure of the microcomputer 38 associated with control of the rotation speed. The microcomputer 38 is configured to monitor an instruction of acceleration by an increase in the speed command voltage V2 (steps SP1 and SP2). If the instruction of acceleration is not detected, the microcomputer 38 drives the fan motor 2 at a rotation speed corresponding to the current speed command voltage V2 (steps SP2 and SP3).

On the other hand, if the instruction of acceleration is detected, the microcomputer 38 calculates a difference between the current rotation speed of the fan motor 2 and a target rotation speed corresponding to the speed command voltage V2 associated with the instruction of acceleration. Further, the microcomputer 38 calculates a rotation speed increment per unit time (e.g., a speed command increase parameter per hour) by dividing the difference by a preset transition time.

Then, the microcomputer 38 rotationally drives the fan motor 2 according to a control target while updating the control target by repeatedly adding the calculated rotation speed increment to the current rotation speed until the control target of the rotation speed reaches the rotation speed corresponding to the instructed speed command voltage V2 (step SP4 to SP6). In this case, the transition time preferably is about 2 minutes, for example. Further, in the present preferred embodiment, the motor preferably is gradually decelerated by the resistance of a load during deceleration.

According to the above configuration, the configuration to generate the speed command is electrically isolated from the main unit, and the microcomputer generates the speed command as the pulse width modulation signal corresponding to a DC voltage. Therefore, the configuration to input the speed instruction is configured simply to satisfy the relaxed safety standards without having to meet the safety standards related to a commercial power source. Thus, it is possible to simplify the configuration as compared with the conventional case. Further, the microcomputer generates a speed command with a varying pulse width, so that it is possible to generate the speed command according to various characteristics.

Further, by generating a speed command such that the pulse width changes stepwise in response to the increase and the decrease of the speed command voltage, it is possible to control the rotation speed of the motor according to the characteristics that the rotation speed is changed stepwise.

Further, by varying the pulse width of the speed command according to the hysteresis characteristics in response to the increase and the decrease of the speed command voltage, it is possible to stably drive the motor by preventing excessive change in the rotation speed with respect to a minute change in the speed command voltage.

Furthermore, since the speed command voltages attenuated at different attenuation rates are inputted and processed through a plurality of systems, even when the speed command voltage is low, it is possible to acquire the analog-to-digital conversion results of the speed command voltage V2 with sufficient resolution and to perform an analog-to-digital conversion process on the speed command voltage V2 in a large dynamic range. As a result, it is possible to enable the speed control of the fan motor 2 with high accuracy.

While the present invention has been shown and described with respect to the preferred embodiments, it will be understood by those skilled in the art that various changes and modifications may be made without departing from the scope of the present invention.

For example, although a case where the signal isolator includes a photo coupler has been described in the above preferred embodiments, the present invention is not limited thereto. For example, the signal isolator may include, e.g., an insulating transformer or the like.

Further, although a case where the speed command voltages attenuated different attenuation rates are inputted and processed through two systems has been described in the above preferred embodiments, the present invention is not limited thereto. If necessary, the speed command voltages may be inputted and processed through three or more systems. In a case where it is possible to ensure sufficient properties for practical use, the speed command voltage may be inputted and processed through one system.

Further, although a case where the speed command is transmitted as the pulse width modulation signal has been described in the above preferred embodiments, the present invention is not limited thereto. For example, the present invention may be widely applied to a case of transmitting the speed command as various signals such as a frequency modulation signal or the like.

Further, although a case of driving the fan motor as the three-phase brushless motor has been described in the above preferred embodiments, the present invention is not limited thereto. Various preferred embodiments of the present invention and modifications and combinations thereof may be widely applicable to a case of driving various motors.

While preferred embodiments of the present invention and modifications thereof have been described above, it is to be understood that variations and modifications will be apparent to those skilled in the art without departing from the scope and spirit of the present invention. The scope of the present invention, therefore, is to be determined solely by the following claims.

What is claimed is:

1. A motor driving device comprising:
   a speed command voltage which is used to generate a high-voltage side speed command voltage and a low-voltage side speed command voltage;
   two analog-to-digital conversion circuits to which respective ones of the high-voltage side speed command voltage and the low-voltage side speed command voltage are inputted, the high-voltage side speed command voltage and the low-voltage side speed command voltage instructing a rotation speed of a motor;
   a microcomputer configured and programmed to generate a speed command having a pulse width which is changed according to the high-voltage side speed command voltage and the low-voltage side speed command voltage based on output signals of the two analog-to-digital conversion circuits;
   a signal isolator configured to transmit the speed command between an input and an output while providing isolation between the input and the output; and
   a drive circuit configured to generate a driving signal in response to the speed command outputted from the signal isolator and to change the rotation speed of the motor.

2. The motor driving device of claim 1, wherein the microcomputer is configured and programmed to generate the speed command such that the pulse width changes stepwise in response to increase and decrease of the high-voltage side speed command voltage and the low-voltage side speed command voltage.

3. The motor driving device of claim 2, wherein the microcomputer is configured and programmed to vary the pulse width of the speed command according to hysteresis characteristics in response to the increase and the decrease of the high-voltage side speed command voltage and the low-voltage side speed command voltage.

4. The motor driving device of claim 1, wherein
   the two analog-to-digital conversion circuits includes a plurality of systems so that the high-voltage side speed command voltage and the low-voltage side speed command voltage are attenuated at different attenuation rates and outputted through the plurality of systems; and
   the microcomputer is configured and programmed to generate the speed command by selecting one of the plurality of systems according to the high-voltage side speed command voltage and the low-voltage side speed command voltage.

5. The motor driving device of claim 1, wherein the microcomputer is configured and programmed to generate the speed command by gradually changing the pulse width according to changes in the high-voltage side speed command voltage and the low-voltage side speed command voltage.

* * * * *